(12) United States Patent
Dumornay

(10) Patent No.: US 6,637,841 B1
(45) Date of Patent: Oct. 28, 2003

(54) COMPACT DISK STORAGE DEVICE

(76) Inventor: Alain Dumornay, 90-08 212th St., Queens Village, NY (US) 11428

(\*) Notice: Subject to any disclaimer, the term of this patent is extended or adjusted under 35 U.S.C. 154(b) by 0 days.

(21) Appl. No.: 09/961,972

(22) Filed: Sep. 24, 2001

(51) Int. Cl.[7] ............................................. A47B 81/06
(52) U.S. Cl. ........................................................ 312/9.48
(58) Field of Search ........................ 312/9.1, 9.9, 9.26, 312/9.28, 9.47, 9.48, 9.64, 323, 327, 328, 351; 211/40, 41; 206/307, 307.1, 308.1, 308.3, 387.15

(56) References Cited

U.S. PATENT DOCUMENTS

| | | | | |
|---|---|---|---|---|
| 1,220,601 A | \* | 3/1917 | Burks | 312/193 |
| 3,013,853 A | \* | 12/1961 | Toms | 312/303 |
| 4,172,625 A | \* | 10/1979 | Swain | 384/23 |
| 4,664,261 A | \* | 5/1987 | Frodelius | 206/308.1 |
| 5,097,946 A | \* | 3/1992 | Emrich | 206/745 |
| 5,215,364 A | \* | 6/1993 | Moore | 204/157.9 |
| 5,385,399 A | \* | 1/1995 | Weidner | 312/190 |
| 5,393,135 A | \* | 2/1995 | Tisbo et al. | 312/9.48 |
| 5,515,979 A | \* | 5/1996 | Salvail | 211/40 |
| 5,707,124 A | \* | 1/1998 | Johnson et al. | 312/9.48 |
| 5,725,105 A | \* | 3/1998 | Boland | 211/40 |

FOREIGN PATENT DOCUMENTS

| | | | |
|---|---|---|---|
| CH | 245460 | \* | 11/1946 |
| FR | 580013 | \* | 10/1924 |

\* cited by examiner

*Primary Examiner*—Lanna Mai
*Assistant Examiner*—John Fitzgerald
(74) *Attorney, Agent, or Firm*—Goldstein & Lavas, P.C.

(57) ABSTRACT

A compact disk storage device including a housing having a top wall, a bottom wall, a front wall, a back wall, and opposed side walls. The front wall has a plurality of slotted compartments formed therein for receiving a plurality of slide trays, each slide wall having a forward end, a rearward end having pins extending outwardly therefrom, and a recessed upper surface for receiving a compact disk. Each of the compartments is defined by an open forward end, a bottom slide wall cut outwardly at a downward angle, and opposed side walls having brackets adjacent to the open forward end. The slide trays slide outwardly of the compartments until the pins abut the brackets whereupon the trays will angle downwardly against the forward edge of the bottom slide wall to allow removal of the compact disk from the tray.

2 Claims, 2 Drawing Sheets

COMPACT DISK STORAGE DEVICE

BACKGROUND OF THE INVENTION

The present invention relates to a compact disk storage device and more particularly pertains to storing compact disks in a manner that allows for their easy removal for use.

The use of media storage devices is known in the prior art. More specifically, media storage devices heretofore devised and utilized for the purpose of storing media elements are known to consist basically of familiar, expected and obvious structural configurations, notwithstanding the myriad of designs encompassed by the crowded prior art-which have been developed for the fulfillment of countless objectives and requirements.

By way of example, U.S. Pat. No. 6,027,186 to Liou discloses a storage device for a plurality of compact disks comprised of a support rack with upper and lower recesses. U.S. Pat. No. 5,819,930 to Yu discloses a container for slidably receiving a number of media elements. U.S. Pat. No. 5,417,323 to Presnick discloses a container for storing a compact disk.

While these devices fulfill their respective, particular objective and requirements, the aforementioned patents do not describe a compact disk storage device for storing compact disks in a manner that allows for their easy removal for use.

In this respect, the compact disk storage device according to the present invention substantially departs from the conventional concepts and designs of the prior art, and in doing so provides an apparatus primarily developed for the purpose of storing compact disks in a manner that allows for their easy removal for use.

Therefore, it can be appreciated that there exists a continuing need for a new and improved compact disk storage device which can be used for storing compact disks in a manner that allows for their easy removal for use. In this regard, the present invention substantially fulfills this need.

SUMMARY OF THE INVENTION

In the view of the foregoing disadvantages inherent in the known types of media storage devices now present in the prior art, the present invention provides an improved compact disk storage device. As such, the general purpose of the present invention, which will be described subsequently in greater detail, is to provide a new and improved compact disk storage device which has all the advantages of the prior art and none of the disadvantages.

To attain this, the present invention essentially comprises a housing having a generally rectangular configuration. The housing has a top wall, a bottom wall, a front wall, a back wall, and opposed side walls. The front wall has a plurality of 1s slotted compartments formed therein. Each of the compartments is defined by an open forward end, a bottom slide wall, and opposed side walls. The bottom slide wall has a forward edge cut outwardly at a downward angle. The opposed side walls of the compartments each have inverted C-shaped brackets secured thereto adjacent to the open forward end. A plurality of slide trays are dimensioned for being slidably received within the plurality of slotted compartments of the housing. Each of the trays has a recessed upper surface for receiving a compact disk therein. The trays each have a forward end and a rearward end. The forward end has a finger recess formed therein. The rearward end has pins extending outwardly therefrom. The slide trays slide outwardly of the compartments until the pins abut the brackets whereupon the trays will angle downwardly against the forward edge of the bottom slide wall to allow removal of the compact disk from the tray.

There has thus been outlined, rather broadly, the more important features of the invention in order that the detailed description thereof that follows may be better understood, and in order that the present contribution to the art, may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved compact disk storage device which has all the advantages of the prior art media storage devices and none of the disadvantages.

It is another object of the present invention to provide a new and improved compact disk storage device which may be easily and efficiently manufactured and marketed.

It is a further object of the present invention to provide a new and improved compact disk storage device which is of durable and reliable construction.

An even further object of the present invention is to provide a new and improved compact disk storage device which is susceptible of a low cost of manufacture with regard to both materials and labor, and which accordingly is then susceptible of low prices of sale to the consuming public, thereby making such a compact disk storage device economically available to the buying public.

Even still another object of the present invention is to provide a new and improved compact disk storage device for storing compact disks in a manner that allows for their easy removal for use.

Lastly, it is an object of the present invention to provide a new and improved compact disk storage device including a housing having a top wall, a bottom wall, a front wall, a back wall, and opposed side walls. The front wall has a plurality of slotted compartments formed therein. Each of the compartments is defined by an open forward end, a bottom slide wall, and opposed side walls. The bottom slide wall has a forward edge cut outwardly at a downward angle. The opposed side walls of the compartments each have brackets secured thereto adjacent to the open forward end. A plurality of slide trays are dimensioned for being slidably received within the plurality of slotted compartments of the housing. Each of the trays has a recessed upper surface for receiving a compact disk therein. The trays each have a forward end and a rearward end. The rearward end has pins extending outwardly therefrom. The slide trays slide outwardly of the compartments until the pins abut the brackets whereupon the trays will angle downwardly against the forward edge of the bottom slide wall to allow removal of the compact disk from the tray.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
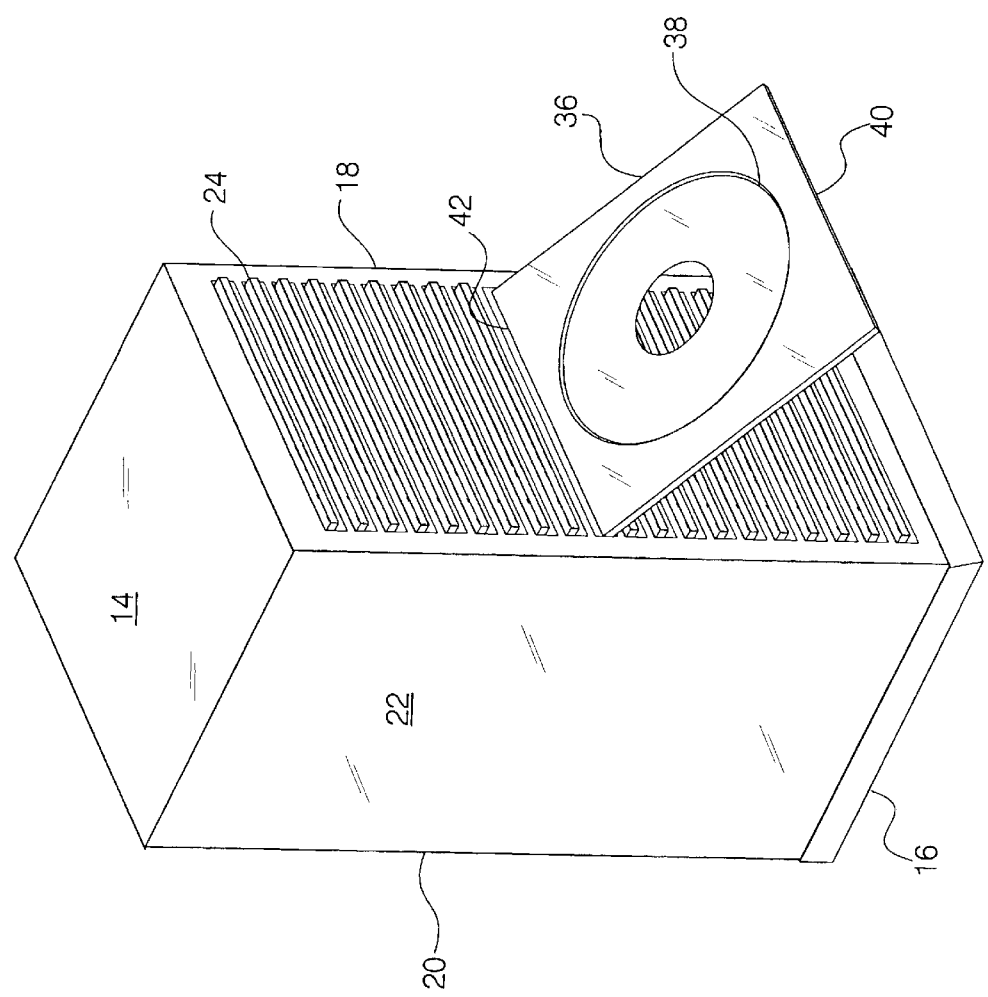
FIG. 1 is a perspective view of the preferred embodiment of the compact disk storage device constructed in accordance with the principles of the present invention.
Figure 3:
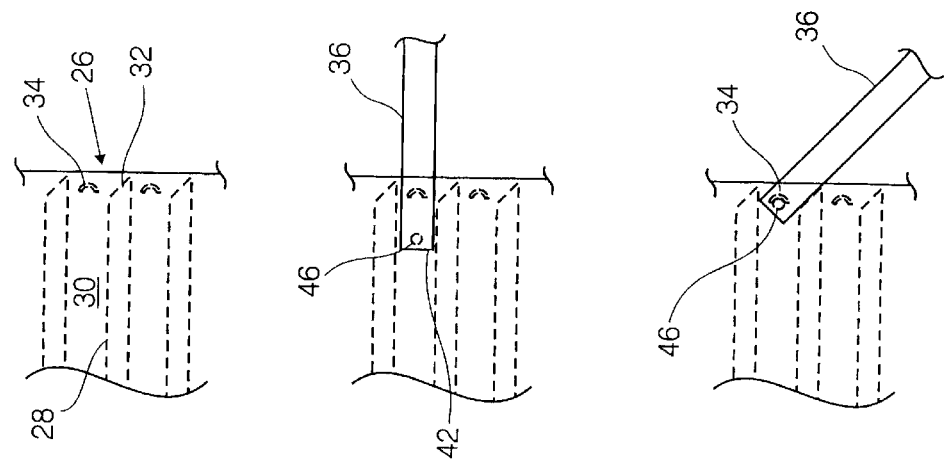
FIG. 3 is a side view of the present invention illustrating the maneuvering of the trays thereof.
Figure 2:
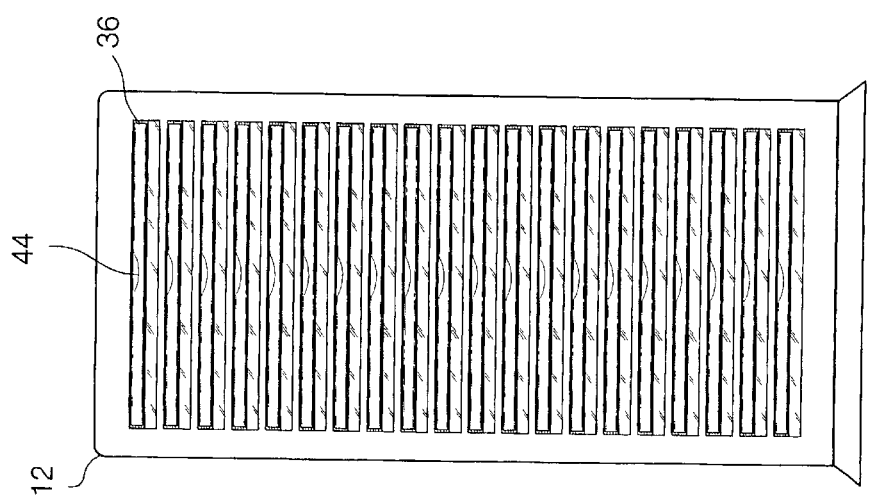
FIG. 2 is a front view of the present invention.

With reference now to the drawings, and in particular, to FIGS. 1 through 3 thereof, the preferred embodiment of the new and improved compact disk storage device embodying the principles and concepts of the present invention and generally designated by the reference number 10 will be described.

Specifically, it will be noted in the various FIGS. that the device relates to a compact disk storage device for storing compact disks in a manner that allows for their easy removal for use. In its broadest context, the device consists of a housing and a plurality of trays. Such components are individually configured and correlated with respect to each other so as to attain the desired objective.

The housing 12 has a generally rectangular configuration. The housing has a top wall 14, a bottom wall 16, a front wall 18, a back wall 20, and opposed side walls 22. The bottom wall 16 is enlarged to provide a stable footing for the housing 12 when positioned on a recipient surface. The front wall 18 has a plurality of slotted compartments 24 formed therein. Each of the compartment's 24 is defined by an open forward end 26, a bottom slide wall 28, and opposed side walls 30. The bottom slide wall 28 has a forward edge 32 cut outwardly at a downward angle. In the preferred embodiment, the degree of the angle is approximately thirty-five degrees. The opposed side walls 30 of the compartments 24 each have inverted C-shaped brackets 34 secured thereto adjacent to the open forward end 26.

The plurality of slide trays 36 are dimensioned for being slidably received within the plurality of slotted compartments 24 of the housing 12. Each of the trays 36 have a recessed upper surface 38 for receiving a compact disk therein. The trays 36 each have a forward end 40 and a rearward end 42. The forward end 40 has a finger recess 44 formed therein. The rearward end 42 has pins 46 extending outwardly therefrom. The slide trays 36 slide outwardly of the compartments 24 until the pin's 46 abut the bracket's 34 whereupon the trays 36 will angle downwardly against the forward edge 32 of the bottom slide wall 28 to allow removal of the compact disk from the tray 36. The pins 46 and brackets 34 will preclude the complete removal of the trays 36 from the compartment's 24.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the united states is as follows:

1. A compact disk storage device for storing compact disks in a manner that allows for their easy removal for use comprising, in combination:

a housing having a generally rectangular configuration, the housing having a top wall, a bottom wall, a front wall, a back wall, and opposed side walls, the front wall having a plurality of slotted compartments formed therein, each of the compartments being defined by an open forward end, a bottom slide wall, and opposed side walls, the bottom slide wall having a forward edge is cut outwardly at a downward angle, the opposed side walls of the compartments each having inverted C-shaped brackets secured thereto adjacent to the open forward end; and a plurality of slide trays dimensioned for being slidably received within the plurality of slotted compartments of the housing, each of the trays having a recessed upper surface for receiving a compact disk therein, the trays each having a forward end and a rearward end, the forward end having a finger recess formed therein, the rearward end having pins extending outwardly therefrom, the slide trays sliding outwardly of the compartments until the pins abut the brackets whereupon the trays will angle downwardly against the forward edge of the bottom slide wall to allow removal of the compact disk from the tray.

2. A compact disk storage device for storing compact disks in a manner that allows for their easy removal for use comprising, in combination:

a housing having a top wall, a bottom wall, a front wall, a back wall, and opposed side walls, the front wall having a plurality of slotted compartments formed therein, each of the compartments being defined by an open forward end, a bottom slide wall, and opposed side walls, the bottom slide wall having a forward edge cut outwardly at a downward angle, the opposed side walls of the compartments each having brackets secured thereto adjacent to the open forward end; and a plurality of slide trays dimensioned for being slidably received within the plurality of slotted compartments of the housing, each of the trays having a recessed upper surface for receiving a compact disk therein, the trays each having a forward end and a rearward end, the rearward end having pins extending outwardly therefrom, the slide trays sliding outwardly of the compartments until the pins abut the brackets whereupon the trays will angle downwardly against the forward edge of the bottom slide wall to allow removal of the compact disk from the tray.

* * * * *